United States Patent
Pai

(10) Patent No.: US 10,459,765 B2
(45) Date of Patent: *Oct. 29, 2019

(54) AUTOMATIC PLACEMENT OF VIRTUAL MACHINE INSTANCES

(71) Applicant: Amazon Technologies, Inc., Seattle, WA (US)

(72) Inventor: Derek Solomon Pai, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 63 days.

This patent is subject to a terminal disclaimer.

(21) Appl. No.: 15/701,172

(22) Filed: Sep. 11, 2017

(65) Prior Publication Data

US 2017/0371708 A1 Dec. 28, 2017

Related U.S. Application Data

(63) Continuation of application No. 14/754,292, filed on Jun. 29, 2015, now Pat. No. 9,760,398.

(51) Int. Cl.
*G06F 9/455* (2018.01)
*G06F 9/50* (2006.01)

(52) U.S. Cl.
CPC ................ *G06F 9/5027* (2013.01)

(58) Field of Classification Search
CPC ............... G06F 9/4843; G06F 9/5027
See application file for complete search history.

(56) References Cited

U.S. PATENT DOCUMENTS

| | | | |
|---|---|---|---|
| 8,849,971 B2 | 9/2014 | Ferris | |
| 8,909,785 B2* | 12/2014 | Franco | H04L 67/1097 709/226 |
| 9,081,617 B1* | 7/2015 | Pendharkar | G06F 9/5044 |
| 9,116,803 B1 | 8/2015 | Agrawal et al. | |
| 9,417,902 B1* | 8/2016 | Noonan | G06F 9/45533 |
| 9,462,055 B1* | 10/2016 | Herrin | H04L 67/1095 |
| 9,471,354 B1 | 10/2016 | Schweitzer | |
| 9,898,315 B1* | 2/2018 | Li | G06F 9/45533 |
| 2006/0184935 A1* | 8/2006 | Abels | G06F 9/5077 718/1 |
| 2006/0184936 A1* | 8/2006 | Abels | G06F 9/5077 718/1 |
| 2006/0184937 A1* | 8/2006 | Abels | G06F 8/65 718/1 |

(Continued)

*Primary Examiner* — Adam Lee
(74) *Attorney, Agent, or Firm* — Davis Wright Tremaine LLP

(57) ABSTRACT

A virtual computer system service receives a request from a customer to instantiate a virtual machine instance onto a computing device. The virtual computer system service obtains a set of preferences from the request that can be used for selecting the computing device from a variety of data zones. The virtual computer system service identifies one or more data zones where virtual machine instances of the customer are operating. Based on the set of preferences and the one or more data zones where the virtual machine instances are operating, the virtual computer system service selects a data zone where the virtual machine instance can be instantiated. The virtual computer system service uses a computing device in the selected data zone to instantiate the virtual machine instance.

20 Claims, 8 Drawing Sheets

(56) References Cited

U.S. PATENT DOCUMENTS

| | | | |
|---|---|---|---|
| 2009/0070771 A1* | 3/2009 | Yuyitung | G06Q 10/06 718/105 |
| 2009/0210527 A1* | 8/2009 | Kawato | G06F 9/45558 709/224 |
| 2009/0300210 A1 | 12/2009 | Ferris | |
| 2010/0005527 A1* | 1/2010 | Jeon | G06F 9/547 726/22 |
| 2010/0017801 A1 | 1/2010 | Kundapur | |
| 2010/0146503 A1 | 6/2010 | Tsai et al. | |
| 2010/0161805 A1 | 6/2010 | Yoshizawa et al. | |
| 2010/0162238 A1* | 6/2010 | Warfield | G06F 9/5077 718/1 |
| 2010/0269109 A1* | 10/2010 | Cartales | G06F 9/5072 718/1 |
| 2010/0325471 A1 | 12/2010 | Mishra et al. | |
| 2011/0131571 A1 | 6/2011 | Heim | |
| 2011/0202640 A1* | 8/2011 | Pillutla | G06F 9/4856 709/221 |
| 2011/0214122 A1* | 9/2011 | Lublin | G06F 9/5033 718/1 |
| 2011/0219372 A1* | 9/2011 | Agrawal | G06F 9/45558 718/1 |
| 2011/0239215 A1* | 9/2011 | Sugai | G06F 9/45558 718/1 |
| 2011/0246627 A1* | 10/2011 | Kern | G06F 9/5072 709/220 |
| 2011/0246992 A1* | 10/2011 | Kern | G06F 9/5072 718/100 |
| 2012/0096459 A1* | 4/2012 | Miyazaki | G06F 9/45558 718/1 |
| 2012/0210068 A1* | 8/2012 | Joshi | G06F 9/45558 711/122 |
| 2012/0216196 A1* | 8/2012 | Kern | G06F 9/5077 718/1 |
| 2012/0221699 A1 | 8/2012 | Moriyasu et al. | |
| 2012/0304171 A1* | 11/2012 | Joshi | G06F 9/45558 718/1 |
| 2012/0311576 A1* | 12/2012 | Shu | G06F 9/45558 718/1 |
| 2012/0331142 A1* | 12/2012 | Mittal | H04L 49/354 709/225 |
| 2013/0042123 A1* | 2/2013 | Smith | G06F 9/5077 713/300 |
| 2013/0111468 A1* | 5/2013 | Davis | G06F 9/5077 718/1 |
| 2013/0111475 A1* | 5/2013 | Govil | G06F 9/5044 718/1 |
| 2013/0160014 A1 | 6/2013 | Watanabe et al. | |
| 2013/0179289 A1 | 7/2013 | Calder et al. | |
| 2013/0179574 A1 | 7/2013 | Calder et al. | |
| 2013/0238775 A1* | 9/2013 | Taguchi | G06F 9/45558 709/223 |
| 2013/0238785 A1 | 9/2013 | Hawk et al. | |
| 2013/0263131 A1 | 10/2013 | Beda, III et al. | |
| 2013/0304899 A1* | 11/2013 | Winkler | H04L 67/34 709/224 |
| 2014/0012940 A1* | 1/2014 | Joshi | G06F 9/45558 709/214 |
| 2014/0053153 A1 | 2/2014 | Kozakai | |
| 2014/0157261 A1* | 6/2014 | Toeroe | G06F 11/1482 718/1 |
| 2014/0215049 A1 | 7/2014 | Provaznik | |
| 2014/0282504 A1* | 9/2014 | O'Donnell | G06F 9/45558 718/1 |
| 2014/0337832 A1* | 11/2014 | Adogla | G06F 9/45533 718/1 |
| 2014/0337833 A1* | 11/2014 | Adogla | G06F 9/45558 718/1 |
| 2014/0337834 A1* | 11/2014 | Adogla | G06F 9/45558 718/1 |
| 2015/0040121 A1* | 2/2015 | Barabash | G06F 9/45558 718/1 |
| 2015/0040129 A1* | 2/2015 | Park | G06F 9/45558 718/1 |
| 2015/0067682 A1 | 3/2015 | Calder et al. | |
| 2015/0095692 A1 | 4/2015 | Thiele et al. | |
| 2015/0100960 A1 | 4/2015 | Shigeta | |
| 2015/0127618 A1 | 5/2015 | Alberti et al. | |
| 2015/0127970 A1 | 5/2015 | Bivens et al. | |
| 2015/0178127 A1 | 6/2015 | Karunamoorthy et al. | |
| 2015/0193245 A1* | 7/2015 | Cropper | G06F 9/45533 718/1 |
| 2015/0242234 A1 | 8/2015 | Harris et al. | |
| 2015/0278041 A1 | 10/2015 | Ganesan et al. | |
| 2015/0293823 A1* | 10/2015 | Bu | H04L 43/0817 714/4.11 |
| 2015/0309825 A1 | 10/2015 | Farkas et al. | |
| 2015/0339146 A1 | 11/2015 | Ponsford et al. | |
| 2015/0370667 A1* | 12/2015 | Bonas | G06F 11/2094 714/6.3 |
| 2015/0378761 A1 | 12/2015 | Sevigny et al. | |
| 2016/0004552 A1 | 1/2016 | Innan et al. | |
| 2016/0026506 A1 | 1/2016 | Jiang | |
| 2016/0077860 A1* | 3/2016 | Machida | G06F 9/5077 718/1 |
| 2016/0321096 A1* | 11/2016 | Harper | G06F 9/45558 |

* cited by examiner

AUTOMATIC PLACEMENT OF VIRTUAL MACHINE INSTANCES

CROSS REFERENCE TO RELATED APPLICATIONS

This application is a continuation of U.S. patent application Ser. No. 14/754,292, filed Jun. 29, 2015, now U.S. Pat. No. 9,760,398, the disclosures of which are incorporated herein by reference in their entirety.

BACKGROUND

Virtual computer systems have evolved and continue to evolve to keep up with the demands of the organizations that use them. Many organizations, for example, utilize virtual computer systems for, among other reasons, the purpose of remotely operating one or more virtual servers, including for the development of web applications. Conventional techniques for provisioning and managing these virtual computer systems on behalf of these organizations typically balancing each customer's virtual computer systems across a variety of data zones. However, conventional techniques often do not provide optimal placement of virtual computer systems to satisfy each organization's individual needs. For instance, while balanced placement of each organization's virtual computer systems may be optimal from a service standpoint for capacity management, conventional techniques often do not provide optimal placement for a organization's own needs, failing to account for an organization's need to reduce costs, latency, while improving virtual computer system availability and recovery times.

BRIEF DESCRIPTION OF THE DRAWINGS

Various embodiments in accordance with the present disclosure will be described with reference to the drawings, in which.

DETAILED DESCRIPTION

Figure 1:
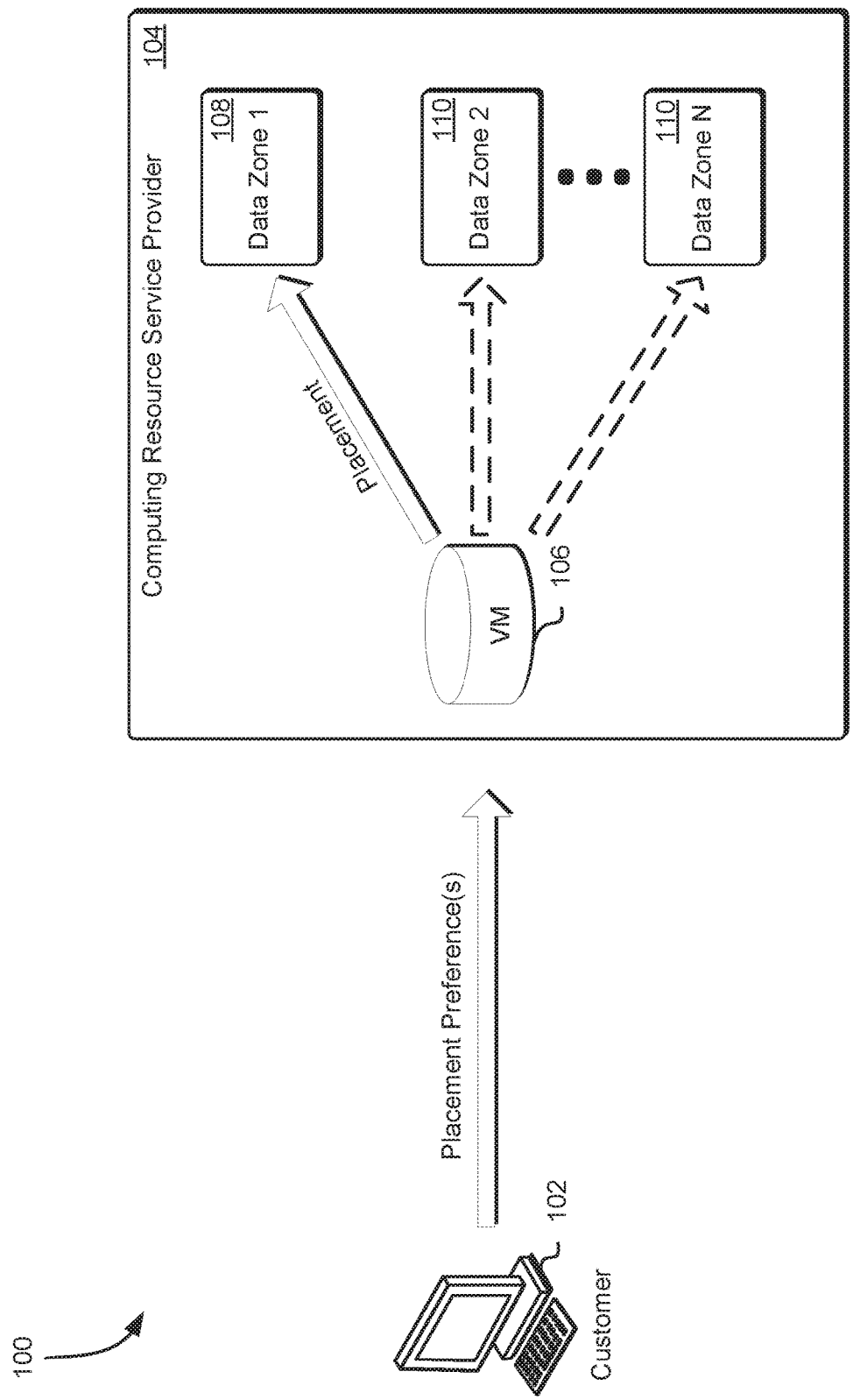
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of customer preferences for placement of a customer's virtual machine instances to select a data zone for instantiating a new virtual machine instance or re-launching an existing virtual machine instance in the event of premature termination of the instance. In an embodiment, an entity (e.g., an organization) communicates with a virtual computer system service, such as through an application programming interface (API) call to the service, to request instantiation of a virtual machine instance to support the entity's business or personal needs. The entity may be a customer of a computing resource service provider that operates various services, such as object-based data storage services, database services, managed queueing services, the aforementioned virtual computer system servicer and a plurality of other services. The request for instantiation of the virtual machine instance may specify a variety of preferences that may be used to determine where within the data zones of the computing resource service provider the virtual machine instance is to be instantiated.

When the virtual computer system service obtains the request from the entity to instantiate the new virtual machine instance and the entity's variety of preferences, the virtual computer system service may determine if the entity has any existing virtual machine instances and, if so, where these instances are placed within the data zones. Based on the provided preferences and the location of any existing virtual machine instances, the virtual computer system service may determine possible data zones where the new virtual machine instance may be instantiated. For instance, the virtual computer system service may use the entity's preferences and the current locations for the entity's existing virtual machine instances to calculate a zone score for each data zone available through the computing resource service provider. The virtual computer system service may use these scores to rank the different data zones for instantiation of the new virtual machine instance.

Once the virtual computer system service has determined which data zones may be used for instantiation of the new virtual machine instance, the virtual computer system service may attempt to instantiate the virtual machine instance in a first data zone. This first data zone may be selected based on the score of each data zone calculated using the entity's preferences and the location of the entity's existing virtual machine instances. If the selected data zone has sufficient capacity to support the new virtual machine instance, the virtual computer system service may instantiate the new virtual machine instance using a physical host (e.g., computer system) of the selected data zone. Alternatively, if the selected data zone does not have sufficient capacity to support the new virtual machine instance, the virtual computer system service may select a different data zone with the next highest score. The virtual computer system service may repeat this process until a data zone is identified that may be used for instantiation of the new virtual machine instance.

In an embodiment, the virtual computer system service evaluates each data zone to determine if a virtual machine instance has terminated, such as due to hardware failure within a particular data zone. If the virtual computer system service determines that a virtual machine instance has been terminated, the virtual computer system service may attempt to re-launch the virtual machine instance within the same data zone in order to maintain consistency with the entity's preferences and balance of the entity's virtual machine instances across various data zones. If the virtual computer system service is unable to re-launch the virtual machine instance within the same data zone, the virtual computer system service may use the entity's instance placement preferences, as well as the location of any of the entity's existing virtual machine instances, to determine which other data zones may be used for re-launching the virtual machine instance. Based on the entity's preferences and location of the entity's existing virtual machine instances, the virtual computer system service may select a first data zone and determine whether the data zone has sufficient capacity to support the virtual machine instance. If the selected data zone lacks sufficient capacity to support the virtual machine instance to be re-launched, the virtual computer system service may select, based on the entity's preferences, a different data zone from the data zones that may be used for re-launching the virtual machine instance and attempt to re-launch the virtual machine instance in this different data zone.

In this manner, the virtual computer system service launches virtual machine instances in particular data zones based on an entity's specified preferences and the location of any of the entity's existing virtual machine instances. In addition, the techniques described and suggested herein facilitate additional technical advantages. For example, because virtual machine instances are instantiated in various data zones based on an entity's preferences and the location of the entity's existing virtual machine instances, the virtual computer system service may place virtual machine instances in data zones that are highly likely to satisfy the entity's business needs while ensuring that a level of balance for the entity's capacity is achieved across various data zones. This may also ensure that in the event of termination of an existing virtual machine instance, the virtual machine instance is re-launched in a location that is most likely to comport with the entity's preferences as well.

FIG. 1 shows an illustrative example of an environment 100 in which various embodiments can be implemented. In the environment 100, a computing resource service provider 104 operates a distributed computer system that provides various computing resource services to customers of the computing resource service provider 104. The computing resource service provider 104 may be an organization that hosts various computing resources on behalf of one or more customers. For example, a computing resource service provider 104 may operate one or more facilities that are used to host various computing hardware resources, such as hardware servers, data storage devices, network devices, and other equipment, such as server racks, networking cables and the like. The computing resource service provider 104 may utilize its computing hardware resources to operate one or more services. Such services may include services that enable customers of the computing resource service provider 104 to remotely manage computing resources to support the customers' operations while reducing or even eliminating the need of the customers to invest in physical equipment. Example services include, but are not limited to, various data storage services (object-based data storage services, archival data storage services, database services and the like), virtual computer system services, program execution services and other services. The services may be used by customers to support a wide variety of activities, such as operating a website, operating enterprise systems supporting an organization, distributed computation and/or other activities.

In an embodiment, the various computing resources hosted by the computing resource service provider 104 are organized into one or more distinct data zones 108, 110. A data zone 108, 110 may be an independent section of a data center that may add redundancy and fault tolerance to a particular location. Each data region may comprise one or more partitions of the data zones 108, 110 which may be used to further allocate resources to the customers utilizing one or more services provided by the computing resource service provider 104. For instance, a customer or other entity may be able to access these data zones 108, 110 through the one or more services provided by the computing resource service provider. For example, a customer may use a customer interface to access a virtual machine instance hosted in a particular data zone 108, 110. Alternatively, a computing resource or customer application may be configured to communicate with the customer interface in order to access these data zones 108, 110 on the customer's behalf. While data zones 108, 110 are used extensively throughout the present disclosure to describe sections of a data center, a data zone 108, 110 may also be defined as any grouping of hardware, regardless of their location within a particular data center or data region (e.g., computer systems having the same hardware configuration, computer systems utilizing the same operating system, etc.).

Accordingly, as illustrated in FIG. 1, the environment 100 includes a customer 102. The customer 102 may be an individual, organization or automated process that could utilize one or more services provided by the computing resource service provider 104. In an embodiment, the customer 102 transmits a request to the computing resource service provider 104 to provision and instantiate a virtual machine instance 106 for the customer's business or personal needs. The request may include one or more preferences for placement of the virtual machine instance 106 into one of the one or more distinct data zones 108, 110 maintained by the computing resource service provider 104. For instance, the customer 102 may specify, through the one or more placement preferences, that the virtual machine instance 106 should be instantiated in a data zone 108, 110 that utilizes more powerful hardware components (e.g., greater capacity, greater memory, greater processing power, etc.) than other data zones. Alternatively, the customer 102 may specify that the virtual machine instance 106 should be instantiated utilizing the least expensive hardware components. If the computing resource service provider 104 maintains one or more other virtual machine instances on behalf of the customer 102, the customer 102 may further specify that the new virtual machine instance 106 should be instantiated in a manner that balances the customer's virtual machine instances across the various data zones 108, 110 and/or that ensures hardware similarity between the customer's existing virtual machine instance and the new virtual machine instance 106.

Once the computing resource service provider 104 has received the request from the customer 102 to instantiate a virtual machine instance 106 and the customer's one or more preferences for placement of this virtual machine instance 106, the computing resource service provider 104 may determine whether the customer 102 has an existing virtual machine instances within the various data zones 108, 110. For instance, the computing resource service provider 102, as a default preference for placement of a virtual machine instance 106, may attempt to balance a customer's virtual machine instances across the various data zones 108, 110 within a data region. For example, if a customer 102 has two virtual machine instances in two data zones and only one virtual machine instance in a third data zone, the computing resource service provider 104, by default, may achieve balance among the various data zones by placing the new virtual machine instance within this third data zone. Thus, the computing resource service provider 104 may utilize the present location of the customer's existing virtual machine instances as a factor for determining where the new virtual machine instance 106 is to be instantiated.

In an embodiment, the computing resource service provider 104 will utilize the customer's specified preferences, as well as the current location of the customer's existing virtual machine instances, to assign a score to each data zone 108, 110. The score may be used by the computing resource service provider 104 to determine which data zone 108, 110 may be used for instantiation of the new virtual machine instance 106, as well as the order in which the computing resource service provider 104 will access these data zones 108, 110 to attempt to instantiate the virtual machine instance 106. For instance, the computing resource service provider 104, upon determining the score for each data zone 108, 110, may select the data zone with the highest score and attempt to instantiate the virtual machine instance 106 utilizing hardware (e.g., computer systems) of the selected data zone. If the computing resource service provider 104 determines that the selected data zone does not have sufficient capacity to support the virtual machine instance 106, the computing resource service provider 104 may select the next data zone with the highest score and attempt to instantiate the virtual machine instance 106 within that particular data zone. The computing resource service provider 104 may continue this process until a data zone is identified that is capable of being used for instantiation of the virtual machine instance 106.

In order to calculate the score for each data zone 108, 110, the computing resource service provider 104 may determine the order in which the customer 102 has specified its one or more preferences for instantiation of the virtual machine instance 106. For instance, a greater weight may be assigned to the customer's preference with the greatest priority. As will be described in greater detail below in connection with FIG. 3, a customer 102 may utilize a customer interface to specify the one or more preferences that may be used for selecting the data zone for instantiation of the virtual machine instance 106. The order in which these preferences are specified may indicate the priority the customer 102 wants to be applied for selection of an appropriate data zone for instantiation of the virtual machine instance 106. Based at least in part on this priority, the computing resource service provider 104 may assign a weight to each preference, with the highest priority preference having the greatest weight and the lowest priority preference having the lowest weight.

As an illustrative example, if the customer 102 has specified four distinct preferences for determining the data zone to be used for instantiation of the virtual machine instance 106, the computing resource service provider 104 may assign a weight of 1.0 to the highest priority preference and a weight of 0.5 to the lowest priority preference. The computing resource service provider 104 may use linear interpolation to determine the weight for each preference in between (e.g., 0.83 and 0.67 for the two other preferences in between). The computing resource service provider 104 may rank each of the data zones 108, 110 for each of the preferences specified by the customer, with a higher score assigned to a data zone that best satisfies the particular preference. For example, if the computing resource service provider 104 maintains three data zones, the data zone that most closely satisfies the requirements for a particular preference may be assigned a score of three, while the data zone that least satisfies the requirements is assigned a score of one. This score may then be multiplied by the applicable preference weight to obtain a preference score for the particular preference. These preference scores may then be summed together to generate a composite score for each data zone 108, 110. The computing resource service provider 104 may use these composite scores to sort the data zones 108, 110 and determine the order in which the data zones 108, 110 are to be used to attempt to instantiate the virtual machine instance 106.

It should be noted that additional and/or alternative techniques may be used to determine an ordering in which the one or more data zones 108, 110 are to be selected for instantiation of the virtual machine instance 106. For instance, in an embodiment, the computing resource service provider is configured to utilize decision tree logic to determine an order in which the data zones 108, 110 are to be selected for determining the data zone for instantiation of the virtual machine instance 106. For example, if the customer 102 has specified that its greatest preference is to select a data zone that would enable instantiation of the virtual machine instance 106 with the least expense to the customer 102, the computing resource service provider 104 may use this preference to select the data zone that would result in the least expense to the customer 102. If the computing resource service provider 104 is unable to instantiate the virtual machine instance 106 within this data zone, the computing resource service provider 104 may continue down a path of the decision tree to select the next highest priority preference specified by the customer 102 to select another data zone. In this manner, the decision tree logic is used to select an appropriate data zone for instantiation of the virtual machine instance 106.

Based at least in part on the ordering technique used by the computing resource service provider 104, the computing resource service provider 104 may select a first data zone 108 to attempt instantiation of the virtual machine instance 106. If the computing resource service provider 104 is able to instantiate the virtual machine instance 106 into this data zone 108, then the computing resource service provider 104 may enable the customer 102 to utilize this virtual machine instance 106 for its own purposes. However, if the computing resource service provider 104 is unable to instantiate the virtual machine instance 106 within this particular data zone 108, the computing resource service provider 104 may select the next data zone 110 based at least in part on the ordering technique utilized and attempt to instantiate the virtual machine instance 106 within this data zone 110. The computing resource service provider 104 may continue this process until the computing resource service provider 104 is able to instantiate the virtual machine instance 106 within a data zone.

At any time, the computing resource service provider 104 may determine that the virtual machine instance 106 has unexpectedly terminated, such as due to hardware failure within the associated data zone 108. If this occurs, the computing resource service provider 104 may attempt to re-launch the virtual machine instance 106 within the same data zone 108 in order to minimize the impact to the customer 102. However, if the computing resource service provider 104 is unable to re-launch the virtual machine instance 106 within the same data zone 108, the computing resource service provider 104 may be required to re-launch the virtual machine instance 106 within an alternative data zone 110 that is not only capable of supporting the virtual machine instance 106 but also best satisfies the customer's specified preferences.

In an embodiment, the computing resource service provider 104 will access any existing customer preferences to determine an ordering for the other data zones 110 that may be able to support a re-launch of the virtual machine instance 106. For instance, the computing resource service provider 104 may utilize the customer's existing preferences to generate a composite score for each of the other data zones 110 and determine, based on these composite scores, an ordering for attempting to re-launch the virtual machine instance 106. Alternatively, the computing resource service provider 104 may utilize decision tree logic to select a data zone for re-launching the virtual machine instance 106. Once the computing resource service provider 104 identifies a data zone 110 capable of supporting the virtual machine instance 106, the computing resource service provider 104 may re-launch the virtual machine instance within this particular data zone 110 and enable the customer 102 to continue use of the virtual machine instance 106.

If the customer 102 has not previously provided any preferences for selection of a data zone 108, 110, the computing resource service provider 104 may utilize one or more default preferences in order to select a data zone for instantiation of the customer's virtual machine instance 106. For instance, the computing resource service provider 104 may have a default preference to balance a customer's virtual machine instances across the number of data zones available. Thus, the computing resource service provider 104 may instantiate the virtual machine instance 106 in the data zone with the fewest existing virtual machine instances for the customer 102. However, when the customer 102 provides its one or more preferences for selection of a data zone for instantiation of a virtual machine instance 106, the computing resource service provider 104 may override its default preferences with the preferences provided by the customer 102. Alternatively, the computing resource service provider 104 may incorporate the default preferences by assigning a standard weight to each of these default preferences that may not equal the weight applied to the customer's preferences but may ensure that these default preferences are still considered when determining placement of a virtual machine instance 106.

Figure 2:
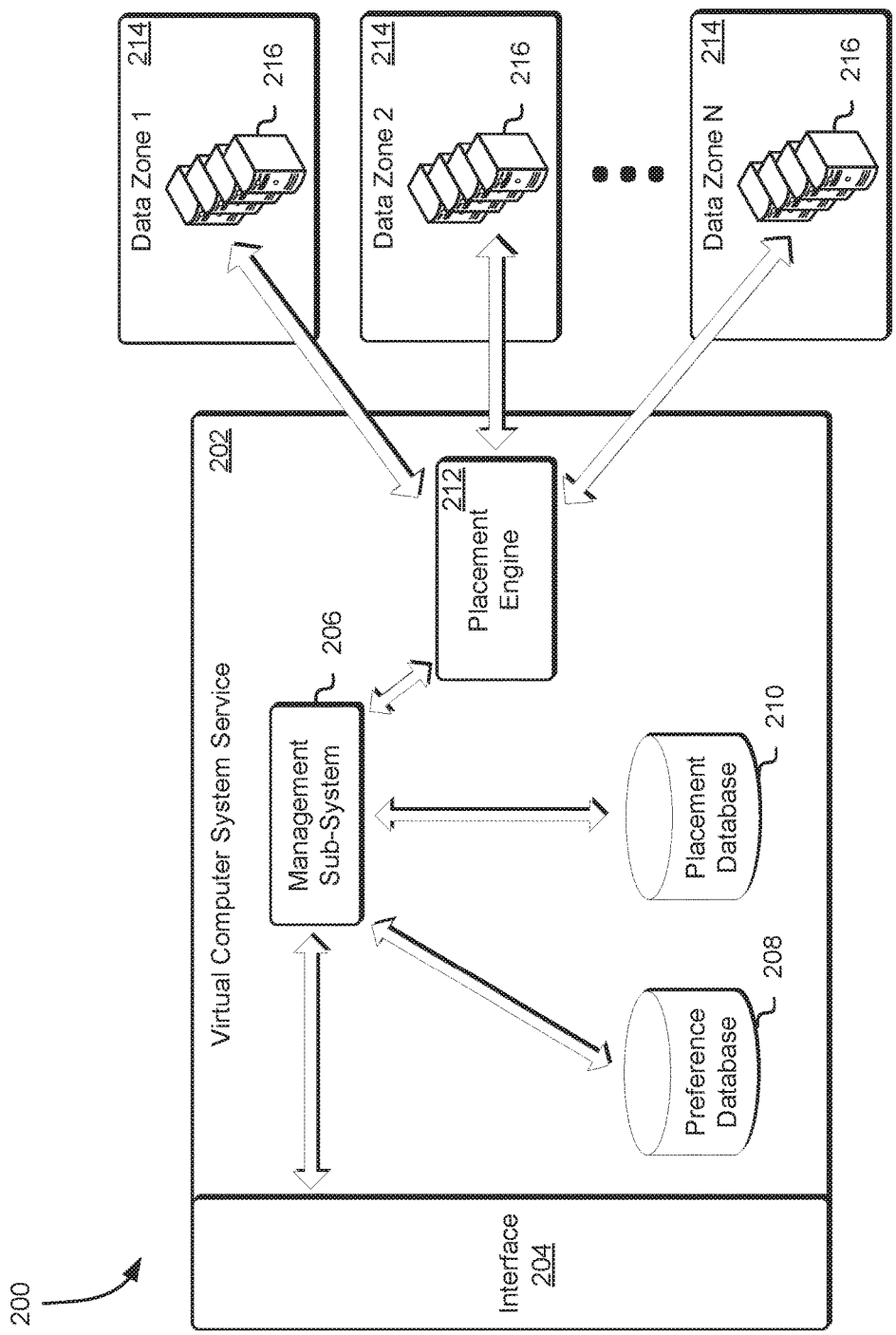
FIG. 2 shows an illustrative example of an environment in which a virtual computer system service determines placement for one or more virtual machine instances based at least in part on customer preferences and locations of existing virtual machine instances in accordance with at least one embodiment.

As noted above, the computing resource service provider may utilize customer preferences, as well as the locations of existing virtual machine instances for the customer, to determine which data zone is to be used to instantiate a new virtual machine instance for the customer. The computing resource service provider may include a virtual computer system service, which may include various components that collectively may be utilized to instantiate and maintain the various virtual machine instances for the customers of the computing resource service provider. Accordingly, FIG. 2 shows an illustrative example of an environment 200 in which a virtual computer system service 202 determines placement for one or more virtual machine instances based at least in part on customer preferences and locations of existing virtual machine instances in accordance with at least one embodiment. The virtual computer system service 202 may include a plurality of physical hosts configured to instantiate virtual machine instances onto virtual computer systems on behalf of the customers of the computing resource service provider. Customers of the computing resource service provider may interact with the virtual computer system service 202 to provision and operate virtual computer systems that are instantiated on physical computing devices hosted (e.g., servers) and operated by the computing resource service provider. The virtual computer systems may be used for various purposes, such as to operate as servers supporting a website. Other applications for the virtual computer systems may be to support database applications, electronic commerce applications, business applications and/or other applications.

In an embodiment, the virtual computer system service 202 provides an interface 204 to customers of the computing resource service provider, which may be utilized by these customers to request instantiation of one or more virtual machine instances within any of the data zones 214 of the computing resource service provider. A customer may utilize the interface 204 through one or more communications networks, such as the Internet. The interface 204 may contain certain security safeguards to ensure that the customer has authorization to access the virtual computer system service 202. For instance, in order to access the virtual computer system service 202, a customer may need to provide a username and a corresponding password or encryption key when using the customer interface 304. Additionally, requests (e.g., application programming interface (API) calls) submitted to the interface 204 may require an electronic signature generated using a cryptographic key such that the electronic signature is verifiable by the virtual computer system service 202, such as by an authorization system (not shown).

Once the customer has gained access to the virtual computer system service 202 through the interface 204, the virtual computer system service 202 may allow the customer to interact, through the interface 204, with a management sub-system 206. The management sub-system 206 may include a variety of computer systems configured to enable a customer to remotely provision a virtual machine instance. A customer may use the interface 204 and the management sub-system 206 to provision and instantiate a virtual machine instance that includes an operating system and a variety of applications suited to the customer's needs. The operating system and the various applications may be maintained in data storage in the form of machine images. When a customer submits a request for instantiation of a virtual machine instance through the management sub-system 206, the virtual computer system service 202 may identify the machine image the customer has requested and allocate the resources necessary (e.g., the processors and random-access memory (RAM) required to operate the components of the machine image) to process the machine image. The machine image may be instantiated on one or more physical storage devices 216 (e.g., one or more servers or hard drives) within a data zone 214, where the one or more physical storage devices 216 may act as a physical host for the instance.

Through the interface 204, the customer may further specify one or more preferences that may be used to determine the data zone 214 where the requested virtual machine instance is to be instantiated. For instance, through the interface 204, the customer may specify that the virtual machine instance should be instantiated in a data zone 214 that provides the customer with the least expensive use of the one or more physical storage devices 216 within the data zone 214. Alternatively, the customer may specify that the virtual machine instance may be instantiated in a data zone 214 in a manner that maintains a balanced distribution of the customer's virtual machine instances across the various data zones made available by the computing resource service provider. Additional preferences may include, but are not limited to, commonality of hardware used for the customer's virtual machine instances, hardware that provides the greatest performance capabilities for the virtual machine instance, newest hardware, and the like. In some embodiments, the customer is not required to provide preferences for placement of the requested virtual machine instance. In such cases, the management sub-system 206 may utilize one or more default preferences as defined by the computing resource service provider for selection of the data zone 214 where the virtual machine instance is to be instantiated.

Once the management sub-system 206 has obtained the request to instantiate a new virtual machine instance and the one or more placement preferences from the customer through the interface 204, the management sub-system 206 may store the one or more placement preferences within a preference database 208 for later use. The preference database 208 may include one or more computer systems configured to collectively store information regarding each customer's preferences for virtual machine instance placement within the variety of data zones 214 of the computing resource service provider. The preference database 208 may include entries for each customer of the computing resource service provider, where for each entry, the virtual computer system service 202 may record the customer's specific preferences. Thus, if it is necessary to retrieve a customer's particular placement preferences, the management sub-system 206 may access the preference database 208 and query a customer identifier to locate the customer's entry within the preference database 208 and the one or more preferences associated with this entry.

The management sub-system 206 may further access a placement database 210 to determine whether the customer has any existing virtual machine instances within any of the data zones 214 provided by the computing resource service provider. Similar to the preference database 208, the placement database 210 may include one or more computer systems configured to collectively store information regarding each customer's virtual machine instances. For instance, for each customer entry within the placement database 210, the entry may specify an identifier for each of the customer's existing virtual machine instances, as well as the data zone 214 where each of these virtual machine instances are located. The customer entry may further specify an identifier for the physical storage device 216 used to instantiate each of the customer's virtual machine instances. When a new virtual machine instance is instantiated, the management sub-system 206 may access the placement database 210 and update the customer entry to specify this new virtual machine instance and its location among the various data zones 214 of the computing resource service provider.

In an embodiment, the management sub-system 206, upon obtaining the request from the customer, through the interface 204, to instantiate a new virtual machine instance, the management sub-system 206 will provide the request, the customer's preferences for placement of the virtual machine instance, and the location information for the customer's existing virtual machine instances to a placement engine 212 of the virtual computer system service 202. The placement engine 212 may include one or more modules of at least one computer system, where the one or more modules may be configured to utilize the provided information to identify a data zone 214 where the virtual machine instance may be instantiated. The placement engine 212 may utilize the provided information to sort the various data zones 214 into an ordering usable to determine which data zone 214 may be used for instantiation of the new virtual machine instance. For instance, in an embodiment, the placement engine 212 will utilize decision tree logic to select a data zone 214 for instantiation of the virtual machine instance. The various branches of the decision tree may be based at least in part on the preferences provided by the customer, preferences obtained from the preference database 208 (e.g., preferences previously provided by the customer), or default preferences that may be used by the placement engine 212 if the customer has never provided any preferences for placement of virtual machine instances.

Using the decision tree logic, the placement engine 212 may generate a decision tree whereby the various decisions to be made are based at least in part on the preferences for placement of the virtual machine instance. For instance, the placement engine 212 may utilize the ordering of the various preferences generated by the customer through the interface 204 to create the decision tree and proceed to identify the data zone 214 where the virtual machine instance is to be instantiated. For example, within the decision tree, the first decision to be made may involve identifying a data zone 214 that best satisfies the preference with the greatest priority and attempting to instantiate the virtual machine instance within this identified data zone 214. If this data zone is unavailable (e.g., not enough capacity to support the instance), the placement engine 212 may process through another branch of the decision tree to reach a second decision point, which may be based at least in part on the next preference with the highest priority. This may enable the placement engine 212 to identify an available data zone 214 that satisfies the customer's or default preferences for placement of the virtual machine instance.

In an alternative embodiment, the placement engine 212 will calculate a composite score for each data zone based at least in part on the customer's and/or default preferences. As noted above, a greater weight may be given to higher priority preferences specified by the customer. The placement engine 212 may rank the various data zones 214 for each of the preferences specified by the customer. This rank may be used to calculate a first score, which may be multiplied by the appropriate preference weight to come up with a data zone score for each data zone based at least on part on the corresponding preference specified by the customer and/or the default preferences. The placement engine 212 may sum these data zone scores together to obtain a composite data zone score for each data zone 214 of the computing resource service provider. This may enable the placement engine 212 to determine an ordering of the various data zones 214 for determining which data zone is to be used for instantiation of the virtual machine instance.

The placement engine 212, in calculating the composite score for each data zone, may further factor in an overall current placement score for the customer. For instance, the placement engine 212 may evaluate the current locations of a customer's existing virtual machine instances and, utilizing the customer's preferences and the default preferences, determine a placement score. This placement score may be higher if the current placement of a customer's existing virtual machine instance closely conforms to the ordering of the customer's preferences and/or the default preferences. The placement engine 212 may simulate placement of the virtual machine instance into each data zone 214 to calculate the impact this placement would have to the placement score and utilize this information as a factor in calculating the composite score for placement of the virtual machine instance.

Once the placement engine 212 has determined the ordering of the one or more data zones 214, the placement engine 212 may select the first data zone in the ordering and attempt to instantiate the virtual machine instance using the one or more physical storage devices 216 of the selected data zone 214. If the placement engine 212 is able to instantiate the new virtual machine instance within this first data zone, the placement engine 212 may provide the location information for this new virtual machine instance to the management sub-system 206. This may cause the management sub-system 206 to access the placement engine 210 to update the customer's entry within the database 210 to specify the location of the new virtual machine instance, as well as other information that may be used to distinguish the virtual machine instance from other instances (e.g., virtual machine instance identifier, etc.). However, if the placement engine 212 is unable to instantiate the virtual machine instance within the first data zone, the placement engine 212 may select the next data zone from the determined ordering and attempt to instantiate the virtual machine instance using the one or more physical storage devices of this particular data zone. The placement engine 212 may continue this process until it successfully instantiates the virtual machine instance within a data zone 214.

The placement engine 212 may further be configured to evaluate the one or more data zones 214 to determine whether a virtual machine instance has been terminated, such as due to a hardware failure of any of the one or more physical storage devices 216 of the corresponding data zone. For instance, each data zone 214 may include one or more monitoring agents configured to monitor the one or more physical storage devices 216 and other devices of the corresponding data zone. If a monitoring agent for a particular data zone determines that there has been a hardware failure within its corresponding data zone, the monitoring agent may transmit a notification to the placement engine 212. This may cause the placement engine 212 to transmit a request to the management sub-system 206 to identify any virtual machine instances that may be affected (e.g., terminated) due to this failure. In response to this request, the management sub-system 206 may access the placement database 210 to identify any affected virtual machine instances that may need to be re-launched in order to prevent further disruption for the customers.

Once the management sub-system 206 has identified the affected virtual machine instances, the management sub-system 206 may identify the customers for whom these virtual machine instances are maintained. This may enable the management sub-system 206 to identify any existing customer preferences from the preference database 208 that may be used to select a new data zone for re-launching the terminated virtual machine instances as needed. Alternatively, the management sub-system 206, through the interface 204, may notify each customer to inform the customer of the terminated virtual machine instance and to enable the customer to specify any new preferences for placement of the virtual machine instance. The management sub-system 206 may provide these preferences, as well as the location information for the customer's existing and operational virtual machine instances to the placement engine 212 to enable the placement engine 212 to determine where to re-launch the terminated virtual machine instance.

Before identifying a new data zone for placement of the virtual machine instance that is to be re-launched, the placement engine 212 may attempt to re-launch the virtual machine instance within the same data zone where the virtual machine instance was originally located. For instance, while a hardware failure within the data zone may have resulted in the premature termination of the virtual machine instance, the data zone may include other physical storage devices 216 usable for instantiation of the virtual machine instance. Thus, the placement engine 212 may determine whether the data zone 214 includes other devices with sufficient capacity and capable to support the virtual machine instance. If so, the placement engine 212 may re-launch the virtual machine instance within the same data zone using these other devices. It should be noted that in some embodiments, the placement engine 212 may forego determining whether the same data zone has sufficient capacity to support the virtual machine instance and instead perform a new analysis to determine the optimal placement of the virtual machine instance based at least in part on the customer's and/or default preferences.

If the placement engine 212 is unable to re-launch the virtual machine instance within the same data zone 214, the placement engine 212 may determine a new data zone for re-launching the virtual machine instance based at least in part on the customer's and/or default preferences. As in the case with the instantiation of a new virtual machine instance, the placement engine 212 may utilize decision tree logic or data zone scoring to generate an ordering of the other data zones 214 provided by the computing resource service provider. The placement engine 212 may proceed to use this ordering to select the data zone at the highest position of this ordering to determine whether this data zone is capable of supporting the virtual machine instance. If so, the virtual machine instance may be re-launched using the one or more physical storage devices 216 of the selected data zone. If the selected data zone is not capable of supporting the virtual machine instance, the placement engine 212 may select the next data zone within the ordering to determine whether this data zone may support the virtual machine instance. The placement engine 212 may continue this process until a data zone is identified that is able to support the virtual machine instance and the virtual machine instance is re-launched within this data zone. Once the virtual machine instance has been re-launched, the placement engine 212 may transmit a notification to the management sub-system 206 of the new location of the virtual machine instance. This may cause the management sub-system 206 to update the placement database 210 to indicate this new location for the virtual machine instance.

Figure 3:
FIG. 3 shows an illustrative example of an interface in which a customer can specify one or more preferences usable for determining locations for placement of one or more virtual machine instances in accordance with at least one embodiment.

As noted above, the virtual computer system service may provide customers of the computing resource service provider with an interface that may be used to request instantiation of one or more virtual machine instances. Further, the virtual computer system service may configure the interface to enable these customers to specify one or more placement preferences for the one or more virtual machine instances. These preferences may be used by the virtual computer system service to order and select data zones for placement of a customer's virtual machine instances. Accordingly, FIG. 3 shows an illustrative example of an interface 300 in which a customer can specify one or more preferences usable for determining locations (e.g., data zones) for placement of one or more virtual machine instances in accordance with at least one embodiment.

The interface 300 may include a placement preference window 302 that may be used by a customer of the computing resource service provider to specify one or more placement preferences usable to identify one or more data zones that may be used for instantiation of a virtual machine instance. Further, these one or more preferences may be used to generate an ordering of the identified one or more data zones to enable the virtual computer system service to select data zones that may better satisfy the customer's specified preferences. In an embodiment, the placement preference window 302 may specify one or more default preferences that may be utilized to identify and sort the one or more data zones that may be used to instantiate a virtual machine instance. For instance, as illustrated in FIG. 3, the virtual computer system service has specified, through the placement preference window 302, that the virtual computer system service has a default preference to balance the customer's various virtual machine instances across the data zones provided by the computing resource service provider. If the customer does not specify any of its own preferences for placement of the virtual machine instance, the virtual computer system service may utilize the default preference specified within the placement preference window 302 to identify and order the data zones for selection of a data zone that may be used to instantiate the virtual machine instance.

In order to enable customers of the computing resource service provider to specify its own placement preferences for instantiation of a virtual machine instance, the virtual computer system service may configure the interface 300 to include one or more preference selection fields 304. The each of the one or more preference selections field 304, as illustrated in FIG. 3, may include a drop down menu with various placement preferences that may be used by the virtual computer system service to identify and order the various data zones for instantiation of the virtual machine instance. In an embodiment, the one or more preference selection fields 304 may be arranged in a manner that enables the customer to specify an ordering for its preferences, such that each preference may be given different weights. This may enable the virtual computer system service to prioritize the preferences based at least in part on the customer's ordering of the various preferences through the preference selection fields 304. For example, as illustrated in FIG. 3, the customer has specified that the greatest priority should be given to selecting a data zone that would reduce the cost for the customer to maintain the virtual machine instance once instantiated. The customer has also specified, in descending order of priority (e.g., weight), hardware similarity among its instances, greater hardware capabilities for the instance, and balancing the customer's instances across the various data zones of the computing resource service provider. As noted above, based at least in part on this priority, the virtual computer system service may assign a weight to each preference, with the highest priority preference having the greatest weight and the lowest priority preference having the lowest weight. This may enable the virtual computer system service to devise a score for each data zone, which may be used to create an ordering of the various data zones. The preferences specified by the customer may override any default placement preferences or may be utilized in conjunction with the default placement preferences, where the default placement preferences may be given a certain weight below that of the highest priority preference specified by the customer.

The placement preference window 302 may further include an add preference button 306, which may be used by the customer to add one or more additional preference selection fields 304. This may enable the customer to specify additional placement preferences and the priority for each of these additional placement preferences. As the customer adds additional preference selection fields 304 to the already selected preferences, the virtual computer system service may adjust the weight applied to each preference. It should be noted that the weights of the one or more preferences may be normalized between a maximum and minimum weight. For instance the preference with the greatest priority may be afforded full weight (e.g., factor=1.0) while the preference with the lowest priority may only be afforded half the weight of the highest priority preference (e.g., factor=0.50). Each preference between these limits may have a weight between the full weight and the half weight of the highest priority and lowest priority preferences, respectively (e.g., 0.5<factor<1.0).

In an alternative embodiment, the ordering of the various preferences specified within the placement preference window 302 can be used to generate a decision tree that may be used to select a data zone for the virtual machine instance that is to be instantiated. For instance, using the preference priority illustrated in FIG. 3, the virtual computer system service may use the highest priority preference to select the data zone that would result in the lowest cost to maintain the instance for the customer. If the virtual computer system service is unable to instantiate the virtual machine instance within this data zone, the virtual computer system service may continue down a path of the decision tree to select the next highest priority preference specified by the customer (e.g., data zone with hardware similar to the customer's other instances that is available) to select another data zone. This may continue until the virtual computer system service is able to identify a data zone that best fulfills the customer's preferences.

Once the customer has specified its one or more placement preferences for the virtual machine instance, the customer may select the next button 308 to transmit these one or more placement preferences to a management sub-system of the virtual computer system service. This may enable the management sub-system to store these preferences within a preference database and to provide these preferences to a placement engine, which may use the preferences to generate an ordering of the various data zones for instantiation of the virtual machine instance that is to be instantiated. These placement preferences may further be used to select a data zone for re-launching a virtual machine instance if the virtual machine instance is prematurely terminated, such as due to a hardware failure in the data zone where the virtual machine instance is located. If the customer does not want to incorporate the specified preferences, the customer may select the cancel button 310 to terminate the interface 300. It should be noted that the interface 300 may be accessed by customers of the computing resource service provider to not only request instantiation of one or more new virtual machine instances but to also change any existing placement preferences the customer may have previously specified.

Figure 4:
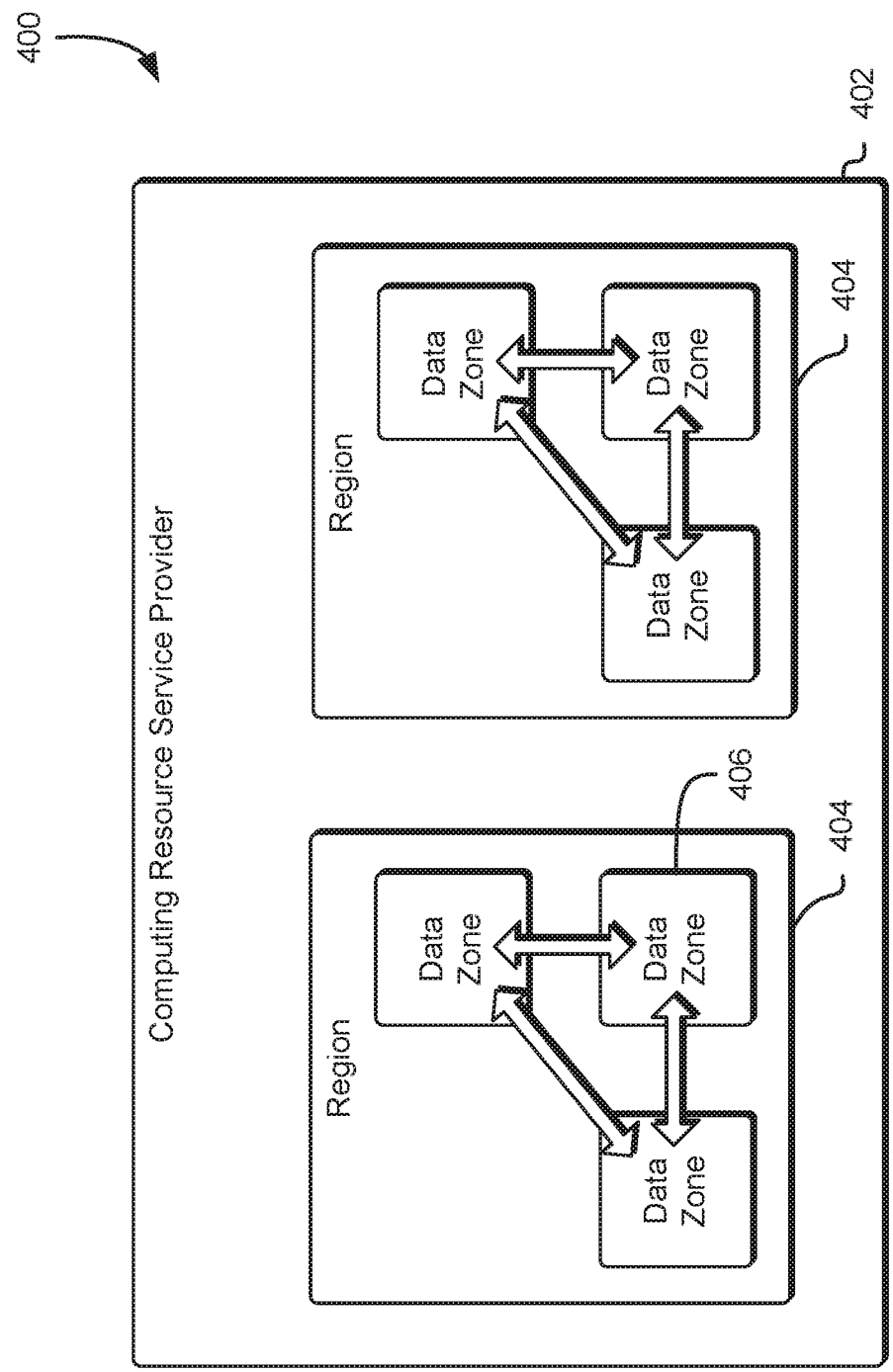
FIG. 4 shows an illustrative example of an environment in which one or more data zones for instantiating one or more virtual machine instances are organized within various regions of a computing resource service provider in accordance with at least one embodiment.

As noted above, the computing resource service provider may maintain one or more data regions, which in turn may comprise one or more data zones for providing a number of services to the customer and for allowing the customer to generate and maintain resources necessary to support its business needs. The one or more data zones may each include various physical storage devices and other computer systems that may be used for instantiation and maintenance of virtual machine instances on behalf of customers of the computing resource service provider. Accordingly, FIG. 4 shows an illustrative example of an environment 400 in which one or more data zones 406 for instantiating one or more virtual machine instances are organized within various data regions 404 of a computing resource service provider 402 in accordance with at least one embodiment. The computing resource service provider 402 may host a variety of services in multiple locations worldwide. Accordingly, each of these locations may include one or more data regions 404, which may be used by customer to access the services provided by the computing resource service provider 402 and to generate a variety of resources, including virtual machine instances, which may be used to support its business. For instance, a customer may access a data region 404 in order utilize a virtual computing system service to initiate a virtual machine instance. This virtual machine instance may be instantiated within that particular data region 404 and thus may be independent from any other virtual machine instances in another data region. Thus, if a customer accesses a second data region 404, the resource that may have been generated in the first data region may not be available in this second data region.

Each independent data region 404 may comprise a number of isolated locations, or data zones 406, which may be designed to be isolated from other data zone failures. Each data zone 406 within a data region 404 may be connected through one or more links which may allow a customer to generate one or more replicas of the customer's resources in other data zones 406 within the data region 404. Thus, if there is a failure of one data zone 406 within a data region 404, the resources may still be available through a different data zone. In order to maintain this isolation, each data zone 406 may operate using its own distinct infrastructure (e.g., servers, power supplies, cooling systems, networking systems, security systems, etc.) which may obviate the need to share common points of failure with other data zones within a data region 404. Thus, in the event of a failure of a particular data zone 406 (e.g., system failure, natural disaster, terrorism, etc.), other data zones within the data region 404 may not be affected.

In an embodiment, the virtual computer system service may order the various data zones 406 in a particular data region 404 based at least in part on placement preferences specified by a customer of the computing resource service provider 402. The virtual computer system service may utilize this ordering of the data zones 406 to attempt instantiation of a virtual machine instance within a data zone having a higher position in the ordering and, thus, having a greater probability of fulfilling a customer's preferences for placement of the virtual machine instance. Further, these placement preferences may be used to identify a data zone 406 that may be used to re-launch a virtual machine instance that has been prematurely terminated, such as due to hardware failure within the original data zone where the virtual machine instance was originally located. In some instances, the placement preferences specified by the customer may enable the virtual computer system service to further order various data zones 406 within various data regions 404 rather than limiting selection to data zones 406 within the customer's particular data region. This may enable greater heterogeneity among the various virtual machine instances of the customer.

Figure 5:
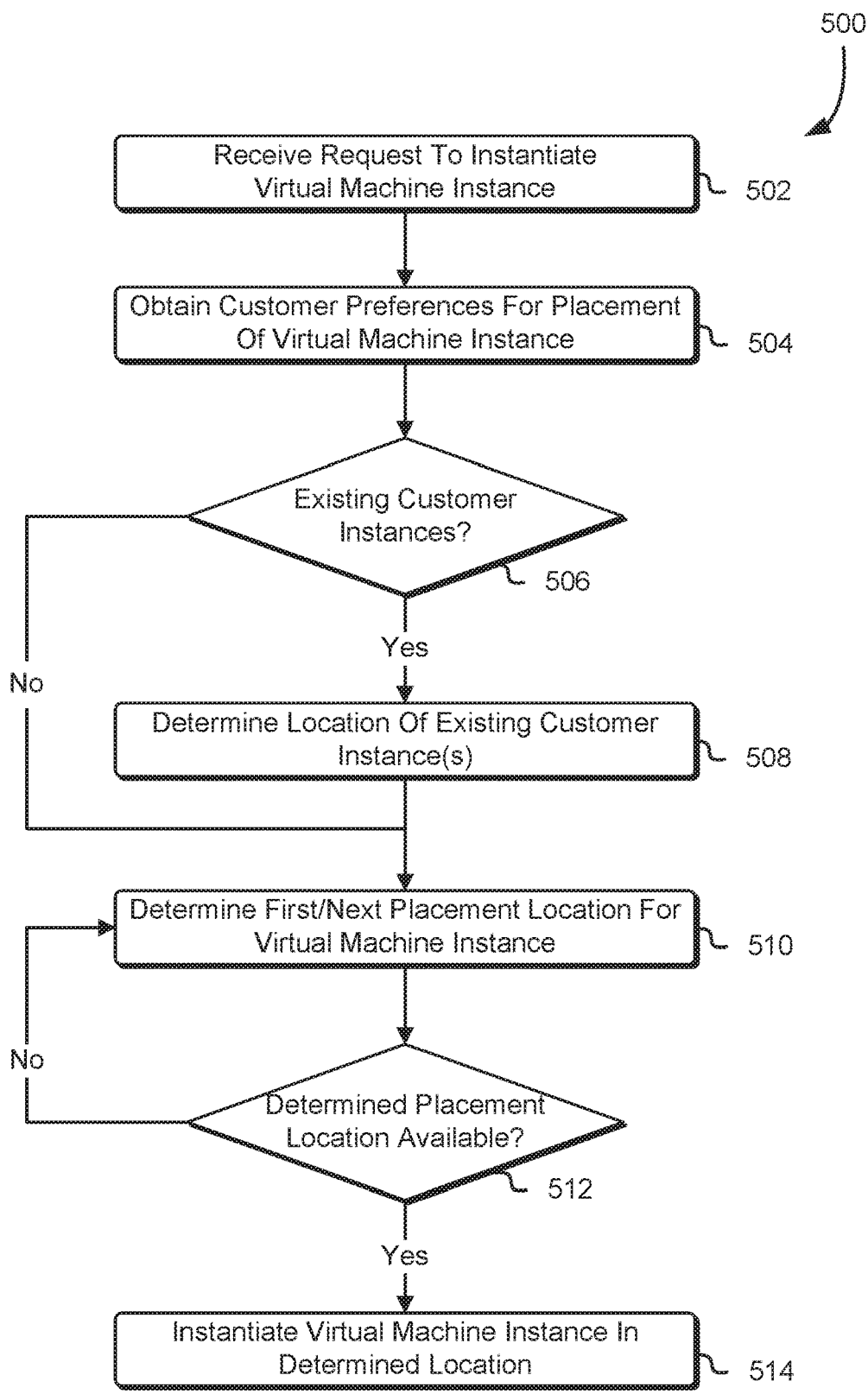
FIG. 5 shows an illustrative example of a process for determining a location for instantiating a virtual machine instance based at least in part on customer preferences and locations for existing virtual machine instances in accordance with at least one embodiment.

As noted above, the virtual computer system service may utilize one or more placement preferences specified by a customer of the computing resource service provider to instantiate a new virtual machine instance on behalf of the customer in a data zone that may have the greatest probability of fulfilling the customer's specified preferences. In order to determine the appropriate data zone to be used for instantiation of the virtual machine instance, the virtual computer system service may utilize the customer's specified preferences, as well as the locations of any existing virtual machine instances, to generate an ordering of the various data zones in order to attempt instantiation of the virtual machine instance in a data zone that best fulfills the customer's preferences. Accordingly, FIG. 5 shows an illustrative example of a process 500 for determining a location for instantiating a virtual machine instance based at least in part on customer preferences and locations for existing virtual machine instances in accordance with at least one embodiment. The process 500 may be performed by the aforementioned virtual computer system service, which may be configured to utilize the customer's specified preferences to generate an ordering of the various data zones and select a data zone for instantiation of the virtual machine instance.

Customers of the computing resource service provider may, at any time, interact with the interface provided by the virtual computer system service to request instantiation of a new virtual machine instance. The customer may specify the virtual machine image that is to be utilized for instantiation, as well as the desired hardware configuration that may be used to support the virtual machine instance. As part of the request, a customer may further specify one or more preferences for placement of the virtual machine instance within the data zones provided by the computing resource service provider. For instance, as illustrated in FIG. 3, a customer may specify, through the interface, one or more preferences that may be considered for placement of the virtual machine instance, as well as the priority that should be given to each of the one or more preferences specified by the customer.

Once the customer has identified its preferences for placement of the virtual machine instance, as well as specified the virtual machine instance that is to be instantiated, the virtual computer system service may receive 502, from the interface, the customer's request to instantiate a virtual machine instance. Further, if the customer has specified one or more placement preferences for the virtual machine instance, the virtual computer system may also obtain 504 these placement preferences for the virtual machine instance that is to be instantiated. It should be noted that in some embodiments, the customer will not provide any placement preferences for the virtual machine instance. If this occurs, the virtual computer system service, instead of obtaining the customer's placement preferences, may obtain one or more default preferences as specified by the computing resource service provider.

In addition to obtaining the customer's placement preferences from the request or the default placement preferences if the customer has not provided its own placement preferences, the virtual computer system service may determine 506 whether the customer currently has any virtual machine instances operating within the various data zones provided by the computing resource service provider. The virtual computer system service may access a placement database to identify any virtual machine instance entries that correspond to a customer identifier for the customer submitting the request for instantiation of the new virtual machine instance. If the customer has any existing virtual machine instances operating within the one or more data zones managed by the computing resource service provider, the virtual computer system service may determine 508 the location (e.g., data zone) for each of the customer's existing virtual machine instances. This may enable the virtual computer system service to utilize these locations as input in the determination of a location for the new virtual machine instance that is to be instantiated.

In some embodiments, a customer can specify that it is concerned with placement of the virtual machine instance in relation to a subset of the customer's existing virtual machine instances. For instance, a customer may have different groups of virtual machine instances operating within the computing resource service provider environment. Through the request to the virtual computer system service to instantiate a new instance, the customer may specify that placement of this particular instance should be based at least in part on existing virtual machine instances for a subset of its existing virtual machine instances. Thus, the virtual computer system service may only consider any existing virtual machine instances for this particular subset, rather than the totality of the customer's virtual machine instances.

If the customer does not have any existing virtual machine instances or the virtual computer system service has determined the locations for the customer's existing virtual machine instances, the virtual computer system service may determine 510 a first placement location (e.g., data zone) for instantiation of the virtual machine instance. In order to determine this first placement location, the virtual computer system service may use the customer's placement preferences, the current location of any of the customer's virtual machine instances, and/or default placement preferences to order the various data zones provided by the computing resource service provider. For instance, in an embodiment, the virtual computer system service will utilize decision tree logic to select the first data zone for instantiation of the virtual machine instance. Using the decision tree logic, the virtual computer system service may generate a decision tree whereby the various decisions to be made are based at least in part on the preferences for placement of the virtual machine instance. For instance, the virtual computer system service may utilize the ordering of the various preferences generated by the customer through the interface to create the decision tree and proceed to identify the data zone where the virtual machine instance is to be instantiated. For example, within the decision tree, the first decision to be made may involve identifying a data zone that best satisfies the preference with the greatest priority and attempting to instantiate the virtual machine instance within this identified data zone.

In an alternative embodiment, the virtual computer system service will calculate a composite score for each data zone based at least in part on the customer's and/or default preferences, as well as the location of the customer's existing virtual machine instances. As noted above, a greater weight may be given to higher priority preferences specified by the customer. The virtual computer system service may generate an ordering of the various data zones for each of the preferences specified by the customer. This ordering may be used to calculate a first score, which may be multiplied by the appropriate preference weight to determine a data zone score for each data zone based at least on part on the corresponding preference specified by the customer and/or the default preferences. For example, if the customer has specified that its highest priority preference is to instantiate an instance within a data zone with the greatest amount of capacity, the virtual computer system service may generate an ordering of the data zones based at least in part on the available capacity of each zone. A data zone higher in the ordering may be assigned a greater score (e.g., closer to 1) whereas a data zone lower in the ordering may be assigned a lower score (e.g., closer to 0). These scores may be multiplied by the preference factor. For example, for a preference with the highest priority, the factor may be set to 1. For preferences with lower priority will be set to a lower value, determined based at least in part on the number of preferences. For example, if there are a total of five preferences, the lowest preference may be assigned a factor score of 0.2 with increasing increments of 0.2 and with the highest priority assigned a factor score of 1. This preference factor score may be multiplied by the data zone score for the particular preference, based at least in part on the ordering described above. The virtual computer system service may add these data zone scores for each preference together to obtain a composite data zone score for each data zone of the computing resource service provider. This may enable the virtual computer system service to determine an ordering of the various data zones and determine 510 a first placement location for the virtual machine instance.

Once the virtual computer system service has determined the first data zone that may be analyzed for instantiation of the virtual machine instance, the virtual computer system service may determine 512 whether the particular placement location is available for instantiation of the virtual machine instance. The virtual computer system service may evaluate the one or more physical computing devices within the selected data zone to determine whether any of these devices may be utilized as a physical host for the virtual machine instance. For instance, the virtual computer system service may determine whether there is sufficient capacity within the particular data zone for the virtual machine instance. If the data zone is not capable of supporting the virtual machine instance, the virtual computer system service may utilize the ordering of the various data zones to determine 510 a next placement location for the virtual machine instance and determine 512 whether this location is available for instantiation of the virtual machine instance.

In some embodiments, the virtual computer system service will utilize available capacity or otherwise the capability of each data zone to support instantiation of the virtual machine instance when calculating the composite score for each data zone. For instance, if a particular data zone does not have sufficient capacity to support the customer's virtual machine instance, the virtual computer system service may assign a low score to the data zone, as instantiation of the virtual machine instance may not be possible within the data zone. As a result, this data zone may be placed towards the bottom of the ordering of data zones, which may prevent the virtual computer system service from attempting to instantiate the virtual machine instance within this particular data zone. Thus, in some instances, the process 500 may be performed without determining whether the placement location is available, as these placement locations may not be selected through the ordering or may be eliminated from the ordering altogether.

If the virtual computer system service determines that the currently selected placement location (e.g., data zone) is capable of supporting the new virtual machine instance, the virtual computer system service may instantiate 514 the new virtual machine instance onto one or more physical computing devices within the selected placement location. The virtual computer system service may access the placement database to create a new virtual machine instance entry for this particular virtual machine instance. This new database entry may specify a unique identifier for the virtual machine instance, as well as a customer identifier for the customer and an identifier of the data zone where the virtual machine instance may be located.

Figure 6:
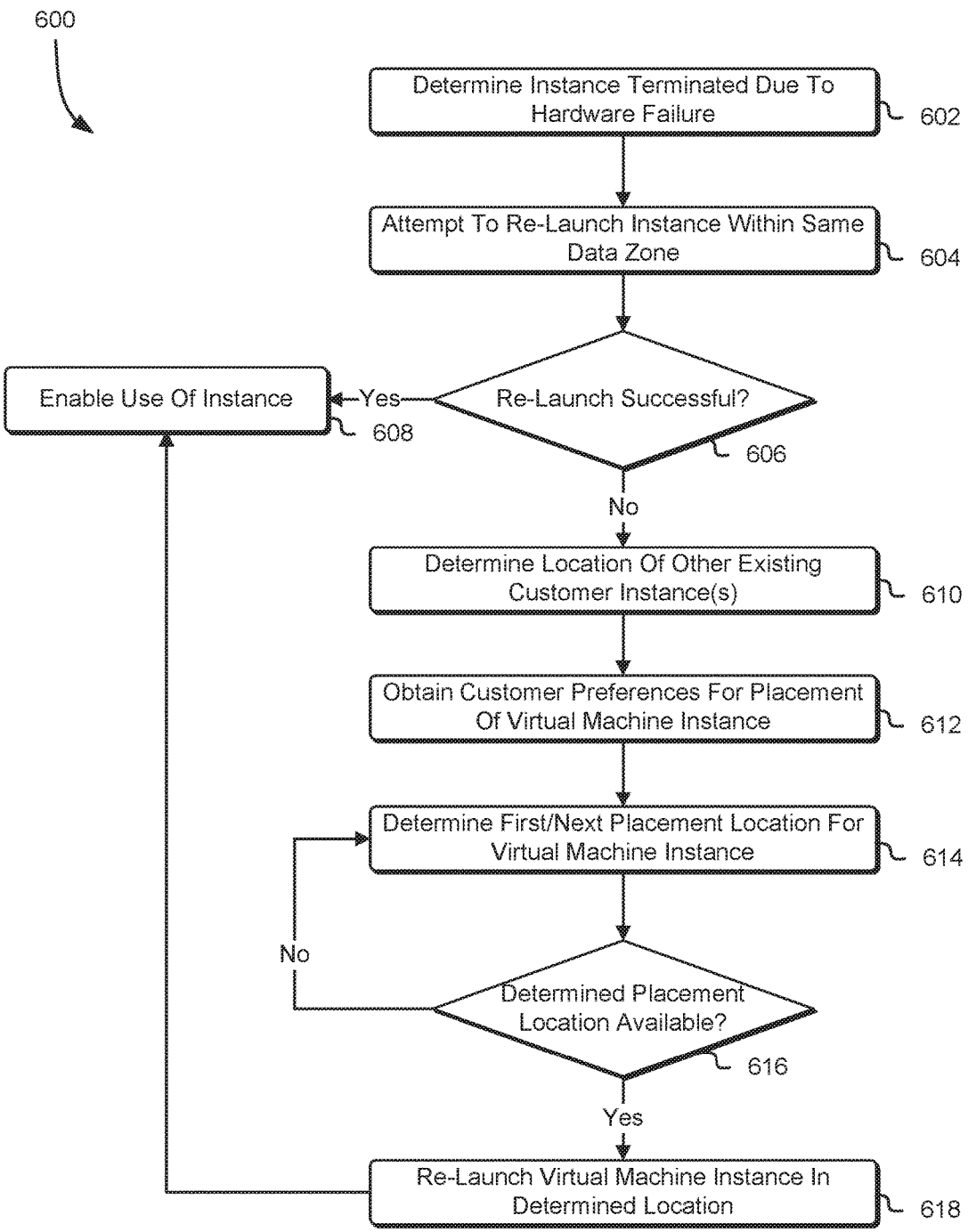
FIG. 6 shows an illustrative example of a process for determining a location for re-launching a virtual machine instance upon determination that the virtual machine instance has terminated due to a hardware failure in accordance with at least one embodiment.

As noted above, a virtual machine instance may be prematurely terminated due to a failure of one or more hardware devices within a particular data zone. When such a failure occurs, the virtual computer system service may re-launch the virtual machine instance in the same data zone using similar hardware or in an alternative data zone, should the original data zone where the virtual machine instance was located not have sufficient capacity to support a re-launch of the virtual machine instance. Accordingly, FIG. 6 shows an illustrative example of a process 600 for determining a location for re-launching a virtual machine instance upon determination that the virtual machine instance has terminated, such as due to a hardware failure in accordance with at least one embodiment. The process 600 may be performed by the aforementioned virtual computer system service, which may be configured to determine when a virtual machine instance has terminated prematurely (e.g., not in response to customer requests) and to identify a location where the virtual machine instance may be re-launched.

Each physical computing device and/or hardware component within a data zone may include a monitoring agent configured to transmit health data to various services of the computing resource service provider, including the virtual computer system service. In the event of a hardware failure, the monitoring agents for the affected physical computing devices and/or hardware components may transmit a notification to the virtual computer system service indicating the nature of the failure. Alternatively, the one or more monitoring agents may not be able to transmit notifications to any of the services. The one or more virtual machine instances maintained by the virtual computer system service may also each include a monitoring agent for providing instance health information to the virtual computer system service. These monitoring agents may enable the virtual computing system service to determine if there is an issue associated with the particular virtual machine instances, physical computing devices and/or hardware components. In the event of such a failure, the virtual computer system service may access the placement database to identify any virtual machine instances instantiated within these failed devices. If so, the virtual computer system service may determine 602 that a virtual machine instance has terminated due to this hardware failure.

Once the virtual computer system service determines that a virtual machine instance has prematurely terminated due to a hardware failure within a data zone, the virtual computer system service may attempt 604 to re-launch the virtual machine instance using hardware components within this same data zone. The virtual computer system service may evaluate the data zone to determine whether there are any operational physical computing devices or other hardware components capable of supporting the virtual machine instance. This may include evaluating the available capacity of the various devices within the data zone, the hardware capabilities of these various devices, and determining whether placement of this virtual machine instance within any of these devices may violate system requirements (e.g., no customer instances can share the same hardware component or physical computing device, etc.). The virtual computer system service may thus determine 606 whether re-launching the virtual machine instance within this data zone can be performed successfully.

In some embodiments, upon termination of the virtual machine instance, the virtual computer system service will re-evaluate the customer's preferences to determine whether attempting to re-launch the virtual machine instance within the same data zone should be performed. For instance, the virtual computer system service may utilize the customer's preferences to generate a new data zone score for each data zone. The virtual computer system service may utilize these scores to determine an ordering of the various data zones for re-launching the virtual machine instance. If the data zone in which the instance was operating is no longer the highest scoring (e.g., first in the ordering) data zone, the virtual computer system service may forego attempting to re-launch the instance within the same data zone and instead select the highest scoring data zone from the ordering.

The virtual computer system service may further re-evaluate the data zones where a customer's exiting virtual machine instances are located in order to determine whether there is a more optimal location for placement of the customer's virtual machine instances. For instance, if a customer provides a new set of placement preferences for its virtual machine instances, the virtual computer system service may re-evaluate the current placement of the customer's existing virtual machine instances and determine, based at least in part on these new preferences, whether there are any other data zones where an instance may be placed that may be an improvement over the customer's current instance placement configuration. If so, the virtual computer system service may terminate a virtual machine instance and attempt to re-launch the virtual machine instance in a more optimal data zone based at least in part on the customer's placement preferences. The virtual computer system service may also re-evaluate a customer's existing preferences at any time (e.g., periodically or aperiodically) to determine whether there are more optimal placement options for the customer's existing virtual machine instances. This may cause the virtual computer system service to terminate an existing virtual machine instance and attempt re-launch of the instance in an alternative data zone without attempting to re-launch the instance within the original data zone where it was originally placed.

If the virtual computer system service is able to re-launch the virtual computer system within the same data zone, the virtual computer system service may enable 608 the customer to resume use of the virtual machine instance within this data zone. Further, the virtual computer system service may update the placement database to indicate the new devices within the data zone being used to support the virtual machine instance. However, if the virtual computer system service is unable to re-launch the virtual machine instance within the original data zone, the virtual computer system service may access the placement database to determine 610 the location of the customer's other virtual machine instances, if any. Additionally, the virtual computer system service may access a placement preference database to obtain 612 the customer's particular placement preferences for its virtual machine instances. These placement preferences may have been previously provided to the virtual computer system service as part of a request to instantiate one or more virtual machine instances. In some embodiments, the virtual computer system service will transmit a notification to the customer indicating failure of the virtual machine instance and requesting verification of the placement preferences to be used for selecting a location for re-launching the virtual machine instance. This may enable the customer to provide new placement preferences, if so desired for placement of the virtual machine instance.

Similar to the process 500 described above, the virtual computer system service may subsequently determine 614 a first data zone for re-launching the virtual machine instance. In order to determine this first placement location, the virtual computer system service may use the customer's placement preferences, the current location of any of the customer's virtual machine instances, and/or default placement preferences to order the various data zones provided by the computing resource service provider. The virtual computer system service may utilize decision tree logic to select the first data zone for re-launching the virtual machine instance. Using the decision tree logic, the virtual computer system service may generate a decision tree whereby the various decisions to be made are based at least in part on the preferences for placement of the virtual machine instance. For instance, the virtual computer system service may utilize the ordering of the various preferences generated by the customer through the interface to create the decision tree and proceed to identify the data zone where the virtual machine instance is to be instantiated. In an alternative embodiment, the virtual computer system service will calculate a composite score for each data zone based at least in part on the customer's and/or default preferences, as well as the location of the customer's existing virtual machine instances. The virtual computer system service may use these composite scores to determine an ordering of the various data zones and determine 614 a first placement location for the virtual machine instance.

Once the virtual computer system service has determined the first data zone that may be analyzed for re-launching the virtual machine instance, the virtual computer system service may determine 616 whether the particular placement location is capable of supporting the virtual machine instance. The virtual computer system service may evaluate the one or more physical computing devices within the selected data zone to determine whether any of these devices may be utilized as a physical host for the virtual machine instance. If the data zone is not capable of supporting the virtual machine instance, the virtual computer system service may utilize the ordering of the various data zones to determine 614 a next placement location for the virtual machine instance and determine 616 whether this location includes hardware components or other physical computing devices that may be used to re-launch the virtual machine instance.

If the virtual computer system service determines that the currently selected placement location (e.g., data zone) can be used to re-launch the virtual machine instance, the virtual computer system service may re-launch 618 new virtual machine instance using one or more physical computing devices within the determined placement location. The virtual computer system service may access the placement database to modify the virtual machine instance entry for this particular virtual machine instance to specify the new location of the virtual machine instance. Further, the virtual computer system service may enable 608 the customer to again utilize the re-launched virtual machine instance in this new location.

Figure 7:
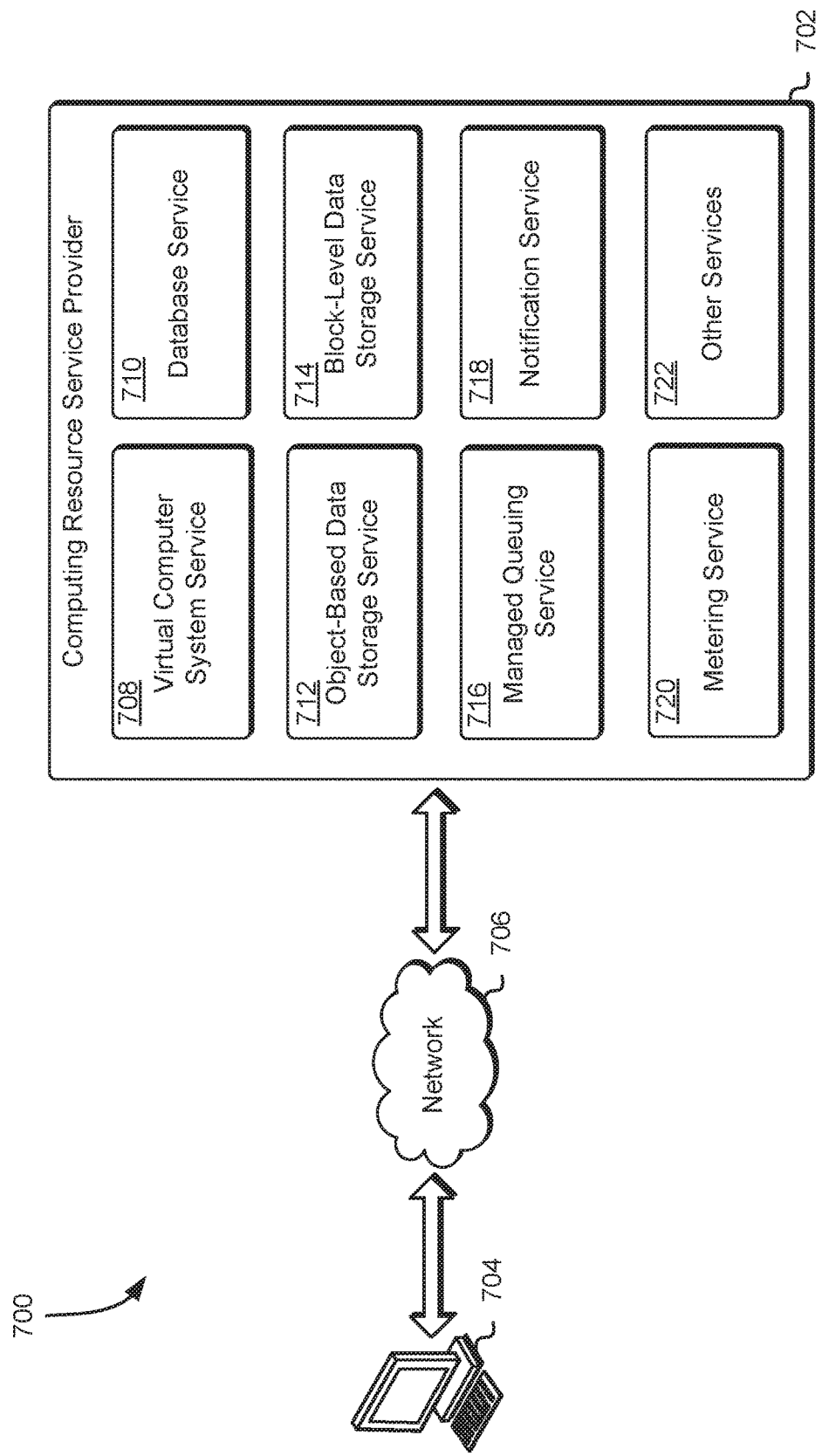
FIG. 7 shows an illustrative example of an environment in which various embodiments can be implemented.

FIG. 7 shows an illustrative example of an environment 700 in which various embodiments can be implemented. In the environment 700, a computing resource service provider 702 may provide a variety of services to a customer 704 or other users. The customer 704 may be an organization that may utilize the various services provided by the computing resource service provider 702 to remotely provision and maintain one or more resources and define a level of access for users of his or her resources. As illustrated in FIG. 7, the customer 704 may communicate with the computing resource service provider 702 through one or more communications networks 706, such as the Internet. Some communications from the customer 704 to the computing resource service provider 702 may cause the computing resource service provider 702 to operate in accordance with various techniques described herein or variations thereof.

As noted above, a computing resource service provider 702 may provide various computing resource services to its customers. For instance, in this particular illustrative example, the computing resource service provider 702 provides at least seven types of services. The services provided by the computing resource service provider, in this example, include a virtual computer system service 708, a database service 710, an object-based data storage service 712, a block-level data storage service 714, a managed queuing service 716, a notification service 718, a metering service 720 and one or more other services 722, although not all embodiments of the present disclosure will include all such services and additional services may be provided in addition to or as an alternative to services explicitly described herein.

The virtual computer system service 708 may include a plurality of physical hosts, in various data zones, configured to instantiate virtual machine instances onto virtual computer systems on behalf of the customers 704 of the computing resource service provider 702. Customers 704 of the computing resource service provider 702 may interact with the virtual computer system service 708 to provision and operate virtual computer systems that are instantiated on physical computing devices hosted (e.g., servers) and operated by the computing resource service provider 702. The virtual computer systems may be used for various purposes, such as to operate as servers supporting a website. Other applications for the virtual computer systems may be to support database applications, electronic commerce applications, business applications and/or other applications.

In an embodiment, a customer 704 provides one or more placement preferences to the virtual computer system service 708 that may be used to determine the physical computing devices to be used to instantiate virtual machine instances (e.g., virtual computer systems) on behalf of the customer. The virtual computer system service 708 may utilize these provided preferences, as well as location information for the customer's other virtual machine instances, to generate an ordering of the various data zones of the computing resource service provider 702. Each data zone may include a variety of physical computing devices that may be used to support and maintain virtual machine instances for the virtual computer system service 708. The virtual computer system service 708 may use the ordering of these data zones to select a data zone and attempt instantiation of the virtual machine instance within the selected data zone. If unsuccessful, the virtual computer system service 708 may access the next data zone specified in the ordering and attempt instantiation of the virtual machine instance within this data zone. The virtual computer system service 708 may continue this process until instantiation of the virtual machine instance is successful within a data zone.

The virtual computer system service 708 may perform a similar process if it is determined that a virtual machine instance has been prematurely terminated, such as due to a hardware failure within its data zone. For instance, the virtual computer system service 708 may attempt to re-launch a terminated virtual machine instance within the same data zone where the virtual machine instance was located. If the virtual computer system service 708 is unable to successfully re-launch the virtual machine instance within this data zone, the virtual computer system service 708 may obtain, from a placement preference database, the one or more placement preferences previously specified by the customer in order to generate an ordering of the data zones that may be used to re-launch the virtual machine instance. The virtual computer system service 708 may select a data zone based at least in part on the ordering, attempting to re-launch the virtual machine instance within the selected data zone. If the virtual computer system service 708 is unable to re-launch the virtual machine instance within this data zone, the virtual computer system service 708 may use the ordering to select the next data zone. This process may continue until a data zone is identified that can be used to re-launch the virtual machine instance.

The database service 710 may support document and key-value data models through operation of one or more databases for one or more customers. Customers of the computing resource service provider 702 may operate and manage a database from the database service 710 by utilizing appropriately configured API calls. This, in turn, may allow a customer to maintain and potentially scale the operations in the database.

The object-based data storage service 712 may enable customers to store data within computing resources within logical data containers. The data stored in the data storage service 712 may be organized into data objects. The data objects may have arbitrary sizes except, perhaps, for certain constraints on size. Thus, the object-based data storage service 712 may store numerous data objects of varying sizes. The object-based data storage service 712 may operate as a key value store that associates data objects with identifiers of the data objects which may be used by the customer to retrieve or perform other operations in connection with the data objects stored by the object-based data storage service 712. Access to the object-based data storage service may be through API calls.

The block-level data storage service 714 may provide customers with persistent block-level storage volumes for use with other services provided by the computing resource service provider. For instance, the block-level data storage service 714 may be configured to provide block-level data storage volumes for use with a virtual machine instance. A customer 704 may interact with the block-level data storage service 714 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer 704, through API calls to the service, may create a file system on top of the block-level data storage volumes or utilize the volume as a block-level storage device (e.g., a hard drive).

The managed queuing service 716 may enable customers 704 to store one or more messages in queues for use by one or more services provided by the computing resource service provider 702. Each message that is stored in a queue may comprise one or more API calls which, when processed by the recipient service, may cause the service to perform one or more actions. Alternatively, each message may comprise any variation of text, such as programming code, Uniform Resource Locators (URLs) for data objects and other statements.

The notification service 718 may enable customers to send notifications to large numbers of recipients or other distributed networks and receive notifications through a communications network. A customer 704 may utilize an interface, provided by the computing resource service provider 702, to create or subscribe to one or more subjects to which one or more messages may be published through. For instance, a customer 704 may use the interface to create a new subject and subscribe to this subject by specifying that any messages published to the subject may be transmitted to a particular location (e.g., electronic mail address, one or more servers, an existing queue within the managed queuing service, etc.). Accordingly, when a customer 704, through a device configured to publish messages using the notification service 718, publishes a message to the subject, the message may be transmitted to each recipient subscribed to the subject.

The metering service 720 may provide a variety of services to enable administrators of the computing resource service provider 702 to determine bandwidth pricing for one or more customers 704 based at least in part on each customer's bandwidth utilization at certain times. The metering service 720 may be configured to obtain raw metering data from a data storage service, such as the object-based data storage service 712 or the block-level data storage service 714 described above, and utilize a map reduce process to aggregate this metering data at a certain level of granularity (e.g., five minute intervals, fifteen minute intervals, etc.). Further, the metering service 720 may be configured to categorize the metering data based at least in part on the network bandwidth flow among the computing resource services provided by the computing resource service provider. For instance, the metering service may categorize the metering data based at least in part on the flow of data through the network (e.g., from the customer 704 to the computing resource service, from the computing resource service to the customer 704, from a computing resource service to another service, etc.). This may enable administrators of the computing resource service provider 702 to identify any customers 704 that may be driving peak bandwidth usage and apportion a cost burden to these customers 704.

Figure 8:
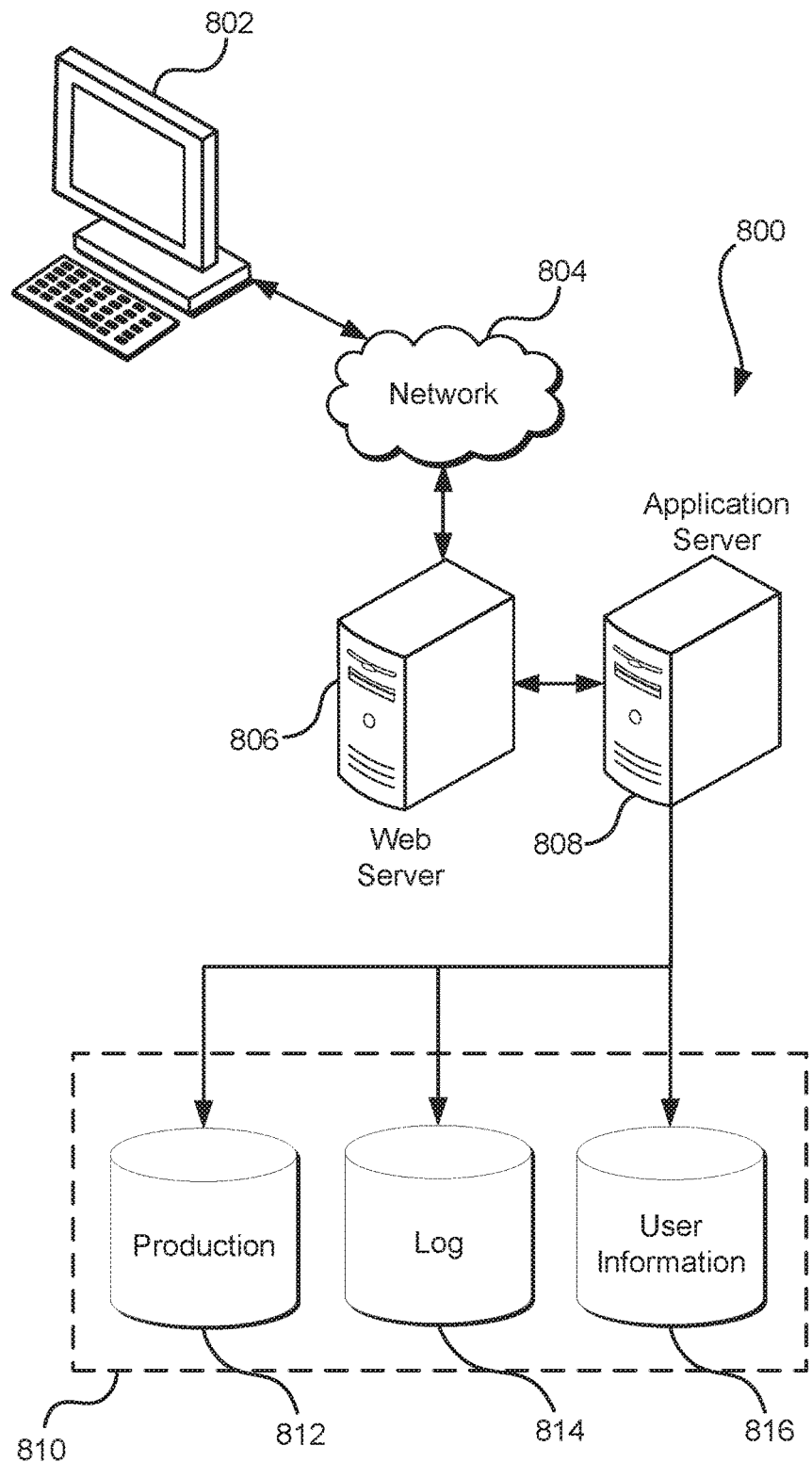
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a request to instantiate a virtual machine instance, the request specifying an ordering of a plurality of preferences for instantiating the virtual machine instance;
    identifying a region of a computing resource service provider;
    identifying two or more data zones of a plurality of data zones in the identified region where a plurality of other virtual machine instances are operating, wherein the plurality of other operating virtual machine instances correspond to an identifier associated with the request, and wherein individual data zones of the plurality of data zones comprise a plurality of computing devices configured for instantiation of virtual machine instances;
    determining, based at least in part on the ordering of the plurality of preferences and the identified two or more data zones, a ranking for the plurality of data zones;
    selecting, based at least in part on the ranking for the plurality of data zones, a data zone from the plurality of data zones; and
    instantiating the requested virtual machine instance onto a computing device within the selected data zone.

2. The computer-implemented method of claim 1, wherein:
    the ranking for the plurality of data zones is determined by calculating, based at least in part on the ordering of the plurality of preferences and the identified two or more data zones, data zone scores for the plurality of data zones; and
    the method further comprises utilizing the data zone scores for the plurality of data zones to select the data zone.

3. The computer-implemented method of claim 1, wherein:
    selecting the data zone includes determining that the data zone has capacity to support the requested virtual machine instance; and
    wherein instantiating the requested virtual machine instance within the selected data zone is performed as a result of the determining that the data zone has the capacity.

4. The computer-implemented method of claim 1, further comprising:
    detecting an issue with the instantiated virtual machine instance in the selected data zone;
    in response to the detecting, attempting to re-instantiate the virtual machine instance in the selected data zone; and
    as a result of failure to re-instantiate the virtual machine instance in the selected data zone:
        selecting, based at least in part on the ranking for the plurality of data zones, an alternative data zone; and
        re-instantiating the virtual machine instance onto a computing device within the alternative data zone.

5. The computer-implemented method of claim 1, further comprising:
    re-instantiating the virtual machine instance onto a computing device within an alternative data zone in response to an event.

6. The computer-implemented method of claim 1, further comprising:
    selecting another computing device within the selected data zone to re-instantiate the virtual machine instance in the selected data zone.

7. A system, comprising:
    one or more processors; and
    memory including instructions that, as a result of being executed by the one or more processors, cause the system to:
        receive a request to instantiate a virtual machine instance, the request specifying an ordering of a plurality of preferences for instantiating the virtual machine instance;
        identify a region of a computing resource service provider;
        identify two or more data zones of a plurality of data zones in the identified region where a plurality of other virtual machine instances are operating, wherein the plurality of other operating virtual machine instances correspond to an identifier associated with the request, and wherein individual data zones of the plurality of data zones comprise a plurality of computing devices configured for instantiation of virtual machine instances;

determine, based at least in part on the ordering of the plurality of preferences and the identified two or more data zones, a ranking for the plurality of data zones;

select, based at least in part on the ranking for the plurality of data zones, a data zone from the plurality of data zones; and instantiate the requested virtual machine instance onto a computing device within the selected data zone.

8. The system of claim 7, wherein the instructions further cause the system to:
detect termination of the instantiated virtual machine instance; and
as a result of a failure to re-instantiate the terminated virtual machine instance in the selected data zone:
use the ranking for the plurality of data zones to select an alternative data zone; and
re-instantiate the terminated virtual machine instance in the alternative data zone.

9. The system of claim 7, wherein the instructions further cause the system to:
detect termination of the instantiated virtual machine instance; and
re-instantiate the terminated virtual machine instance using another computing device within the selected data zone.

10. The system of claim 7, wherein the instructions that cause the system to select the data zone further cause the system to:
determine that the selected data zone has capacity to support the requested virtual machine instance.

11. The system of claim 7, wherein the instructions that cause the system to determine the ranking for the plurality of data zones further cause the system to:
calculate, based at least in part on the ordering of the plurality of preferences and the identified two or more data zones, data zone scores for the plurality of data zones; and
use the data zone scores to determine the ranking for the plurality of data zones.

12. The system of claim 7, wherein the instructions further cause the system to:
detect termination of the instantiated virtual machine instance:
attempt to re-instantiate the terminated virtual machine instance in the selected data zone; and
as a result of failure to re-instantiate the terminated virtual machine instance in the selected data zone:
generate a second ranking for the plurality of data zones utilizing the ordering of the plurality of preferences and the identified two or more data zones, the second ranking excluding the selected data zone;
select an alternative data zone based at least in part on the second ranking for the plurality of data zones; and
re-instantiate the virtual machine instance in the alternative data zone.

13. A non-transitory computer-readable storage medium having stored thereon executable instructions that, as a result of being executed by one or more processors of a computer system, cause the computer system to at least:
in response to a request to instantiate a virtual machine instance, obtain, from the request, an ordering of a plurality of preferences for instantiating the virtual machine instance;
identify a region of a computing resource service provider;
identify two or more data zones of a plurality of data zones in the identified region where a plurality of other virtual machine instances are operating, wherein the plurality of other operating virtual machine instances correspond to an identifier associated with the request, and wherein individual data zones of the plurality of data zones comprise a plurality of computing devices for instantiation of virtual machine instances;
determine, based at least in part on the ordering of the plurality of preferences and the identified two or more data zones, a ranking of the plurality of data zones;
select, based at least in part on the ranking of the plurality of data zones, a data zone from the plurality of data zones; and
instantiate the requested virtual machine instance in the selected data zone.

14. The non-transitory computer-readable storage medium of claim 13, wherein the executable instructions further cause the computer system to:
detect termination of the instantiated virtual machine instance;
identify a computing device in the selected data zone capable of instantiating the terminated virtual machine instance; and
re-instantiate the terminated virtual machine instance in the selected data zone using the identified computing device.

15. The non-transitory computer-readable storage medium of claim 13, wherein the executable instructions further cause the computer system to:
detect termination of the instantiated virtual machine instance;
attempt to re-instantiate the terminated virtual machine instance in the selected data zone; and
as a result of failure to re-instantiate the terminated virtual machine instance in the selected data zone:
select, based at least in part on the ranking of the plurality of data zones, an alternative data zone; and
re-instantiate the terminated virtual machine instance in the alternative data zone.

16. The non-transitory computer-readable storage medium of claim 13, wherein the executable instructions that cause the computer system to select the data zone further cause the computer system to:
select, based at least in part on the ranking of the plurality of data zones, a data zone;
determine that a computing device of the selected data zone has capacity to support the requested virtual machine instance; and
instantiate the requested virtual machine instance onto the determined computing device within the selected data zone.

17. The non-transitory computer-readable storage medium of claim 13, wherein the executable instructions further cause the computer system to:
detect termination of the instantiated virtual machine instance;
attempt to re-instantiate the terminated virtual machine instance in the selected data zone; and
as a result of failure to re-instantiate the terminated virtual machine instance in the selected data zone:

generate a second ranking of the plurality of data zones utilizing the ordering of the plurality of preferences and the identified two or more data zones, the second ranking of the plurality of data zones excluding the selected data zone;

select an alternative data zone based at least in part on the second ranking of the plurality of data zones; and re-instantiate the terminated virtual machine instance in the alternative data zone.

18. The non-transitory computer-readable storage medium of claim 13, wherein the executable instructions that cause the computer system to determine the ranking of the plurality of data zones further cause the computer system to:

calculate, based at least in part on the ordering of the plurality of preferences and the identified two or more data zones, data zone scores for the plurality of data zones; and utilize the data zone scores to generate the ranking of the plurality of data zones.

19. The non-transitory computer-readable storage medium of claim 13, wherein the executable instructions that cause the computer system to select the data zone further cause the computer system to:

exclude another data zone from selection as a result of the another data zone lacking capacity to launch the requested virtual machine instance.

20. The non-transitory computer-readable storage medium of claim 13, wherein the executable instructions further cause the computer system to:

receive an ordering of a second plurality of preferences for instantiation of the requested virtual machine instance; and utilize the ordering of the plurality of preferences, the ordering of the second plurality of preferences, and the identified two or more data zones to select another data zone.

* * * * *